(12) United States Patent
Davidson

(10) Patent No.: US 10,156,264 B2
(45) Date of Patent: Dec. 18, 2018

(54) ROTARY JOINT CONSTANT VELOCITY STABILIZER

(71) Applicant: D & D Design and Manufacturing, Inc., Wheatland, OK (US)

(72) Inventor: Robin Davidson, Wheatland, OK (US)

(73) Assignee: D & D Design and Manufacturing, Inc., Wheatland, OK (US)

( * ) Notice: Subject to any disclaimer, the term of this patent is extended or adjusted under 35 U.S.C. 154(b) by 336 days.

(21) Appl. No.: 15/247,417

(22) Filed: Aug. 25, 2016

(65) Prior Publication Data

US 2017/0058961 A1   Mar. 2, 2017

Related U.S. Application Data

(60) Provisional application No. 62/210,060, filed on Aug. 26, 2015.

(51) Int. Cl.

| | |
|---|---|
| *F16D 3/30* | (2006.01) |
| *F16D 3/50* | (2006.01) |
| *F16M 11/12* | (2006.01) |
| *F16M 11/18* | (2006.01) |
| *H01Q 1/18* | (2006.01) |

(52) U.S. Cl.
CPC ............... *F16D 3/30* (2013.01); *F16D 3/50* (2013.01); *F16M 11/121* (2013.01); *F16M 11/18* (2013.01); *H01Q 1/18* (2013.01); *Y10T 403/32008* (2015.01); *Y10T 403/32057* (2015.01)

(58) Field of Classification Search
CPC .... F16D 3/26; F16D 3/30; F16D 3/50; F16M 11/12; F16M 11/121; F16M 11/18; H01Q 1/18; Y10S 464/904; Y10T 403/32; Y10T 403/32008; Y10T 403/32057; Y10T 403/32073
USPC .......... 403/52, 53, 59, 61; 464/81, 112, 147, 464/904
See application file for complete search history.

(56) References Cited

U.S. PATENT DOCUMENTS

| | | | | |
|---|---|---|---|---|
| 2,292,675 | A | * | 8/1942 | Thiry ...................... F16C 11/04 403/133 |
| 2,475,746 | A | | 7/1949 | Kenyon |
| 3,069,915 | A | | 12/1962 | Sawle, Jr. |
| 4,804,352 | A | | 2/1989 | Schmidt |
| 5,028,180 | A | * | 7/1991 | Sheldon ............... B23Q 1/5462 248/631 |

(Continued)

*Primary Examiner* — Josh Skroupa
(74) *Attorney, Agent, or Firm* — Dunlap Codding, P.C.

(57) ABSTRACT

A rotary joint constant velocity stabilizer for connecting a first rotatable body and a second rotatable body, the first and second rotatable bodies being rotatable about a generally common axis of rotation and rotatable at substantially similar angular velocities. The rotary joint constant velocity stabilizer has a first base, a second base, and a shaft. The shaft is connected to first base such that the shaft is pivotable relative to the first base about a first axis extending from a first side to a second side of the first base. The shaft is connected to the second base such that the shaft is pivotable about a second axis extending from a first side to a second side of the second base, the shaft being slidable relative to the second base along a third axis normal to the first axis and the second axis, and rotatable relative to the second base about the third axis while preventing relative rotational motion between the first base and the second base.

12 Claims, 6 Drawing Sheets

(56) References Cited

U.S. PATENT DOCUMENTS

| | | | |
|---|---|---|---|
| 6,171,309 B1 | 1/2001 | Huebner | |
| 6,398,444 B1 | 6/2002 | Salmela | |
| 8,184,058 B2 | 5/2012 | Swanson | |
| 8,505,392 B2 * | 8/2013 | Zhang | F16M 11/18 |
| | | | 33/503 |

* cited by examiner

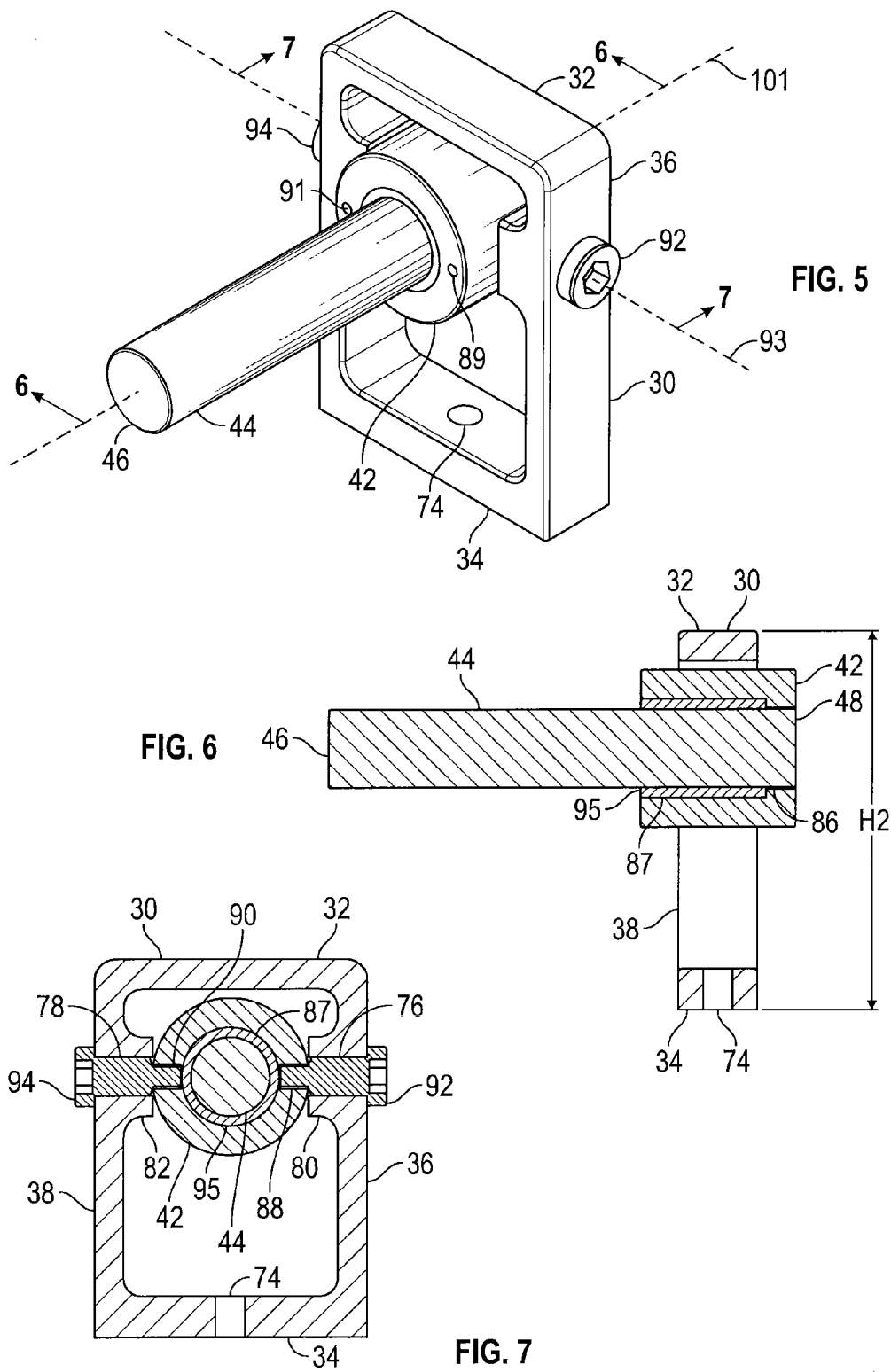

ROTARY JOINT CONSTANT VELOCITY STABILIZER

CROSS-REFERENCE TO RELATED APPLICATION

This application claims the benefit of U.S. Provisional Application Ser. No. 62/210,060, filed Aug. 26, 2015; the entire contents of which being hereby expressly incorporated herein by reference.

BACKGROUND

Torque arms have been used to connect a first rotatable body (driven, for example, by a motor) to a second concentric rotatable body (driven by the first rotatable body), both rotating about a common axis of rotation.

However, during the rotation of first and second rotatable bodies, radial distance there between may vary because of component run-outs and/or variations in the axes of rotations of bodies. As is known in the art, component run-out refers to the variation in the radial distance of a given point on an outer surface of a rotating component relative to the axis of rotation, due to, for example, an imbalance of material of the rotating body on one side as compared to the other side, as the component is rotated through a 360° rotation. Torque bars are, therefore, subject to deflection and/or bending due to variations in the radial distance between first and second rotating bodies. Bending and/or deflection of torque bars may result in a misalignment between first and second rotatable bodies. Such misalignment between first and second rotatable bodies renders the positional measurements of an encoder disposed on second rotatable body inaccurate and unreliable.

One example where such a torque bar may be used is a radar system wherein a radar antenna is mounted on a rotatable platform. The rotatable platform is configured to continuously rotate (e.g. via a drive motor assembly) about a central axis through three hundred and sixty degrees of rotation. As is known in the art, such a radar antenna uses an electromechanical connection, which is most often referred to as a slip ring, to transmit electrical signals between a stationary structure (such as a grounding connection) and the rotatable platform, which includes the radar antenna. As is known in the art, a slip ring has a rotatable component generally tracking the rotatable platform and a stationary component in at least electrical communication with the rotatable component. Radar slip rings may further include a position or azimuth encoder to determine the relative angle of the rotatable component (and thereby that of the rotatable platform) with respect to the stationary component of the slip ring and ultimately determine the angular orientation of the rotatable radar antenna.

Under ideal conditions, the rotatable component of the radar slip ring and the rotatable platform would have the same or consistent angular bearing relative to the stationary component of the radar slip ring. A signal generating component of the encoder may, therefore, be mounted on the rotatable component of the slip ring and a reference component of the encoder may be mounted on the stationary component of the slip ring. However, the variations in the axes of rotation of the rotating platform and the rotating component of the slip ring and component run-outs of these rotatable parts may cause undesirable bending and/or deflection of a conventional torque bar connecting the rotatable component of the slip ring and the rotatable platform of the radar, as described above. Such undesirable bending may introduce positional or angular misalignment between the rotating platform and the rotating component of the slip-ring, thereby rendering the positional measurements of the encoder generally unreliable and inaccurate. This, in turn, may adversely affect the performance of the rotatable radar antenna. Alternatives to conventional threaded, rigid torque bars are, therefore, desirable for mitigating these adverse effects on positional accuracy measurements.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 5 is a perspective view of a second base assembly and shaft of the rotary constant velocity stabilizer.

FIG. 6 is a sectional view of the second base assembly and the shaft taken along line 6-6 of FIG. 5.

FIG. 7 is a sectional view of the second base assembly and the shaft taken along line 7-7 of FIG. 5.

DETAILED DESCRIPTION OF EXEMPLARY EMBODIMENTS

Figure 1:
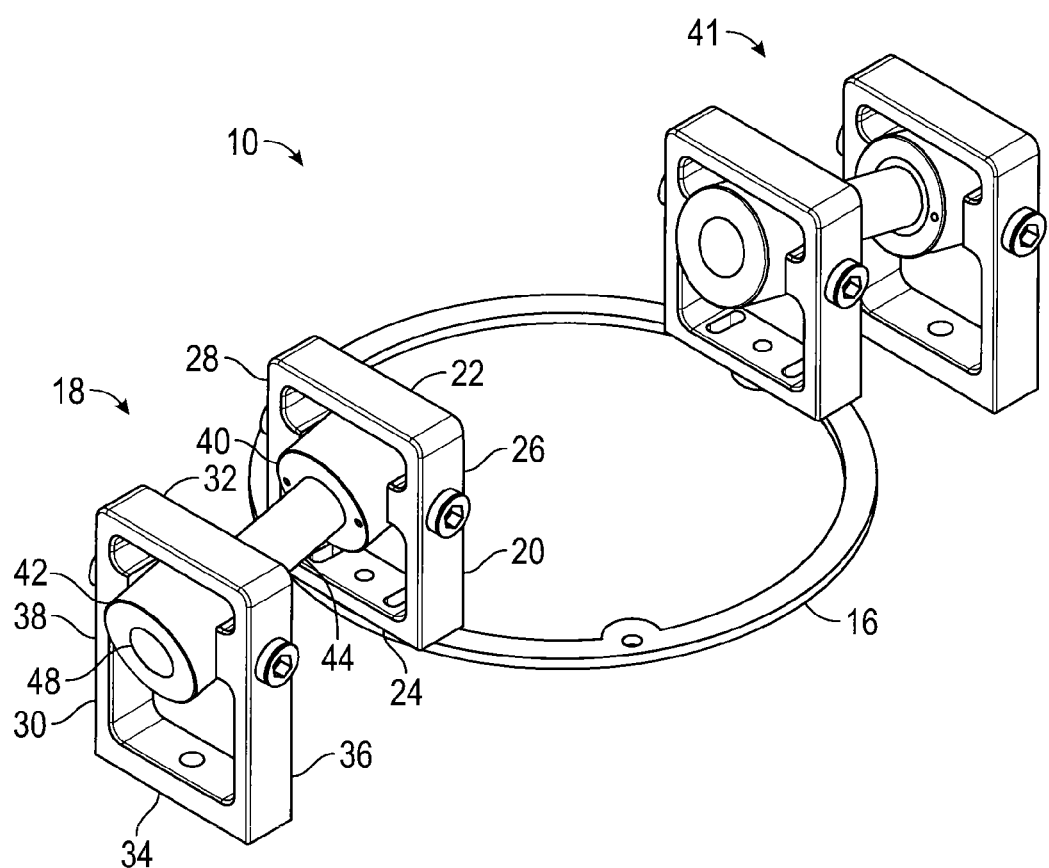
FIG. 1 is a perspective view of a rotary joint constant velocity stabilizer constructed in accordance with the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having," and any variations thereof, are intended to cover a non-exclusive inclusion. For example, a process, method, article, or apparatus that comprises a list of elements is not necessarily limited to only those elements, and may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B is true (or present).

In addition, use of the "a" or "an" are employed to describe elements and components of the embodiments disclosed herein. This is done merely for convenience and to give a general sense of the inventive concepts. This description should be read to include one or at least one and the singular also includes the plural unless it is obvious that it is meant otherwise.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 11:
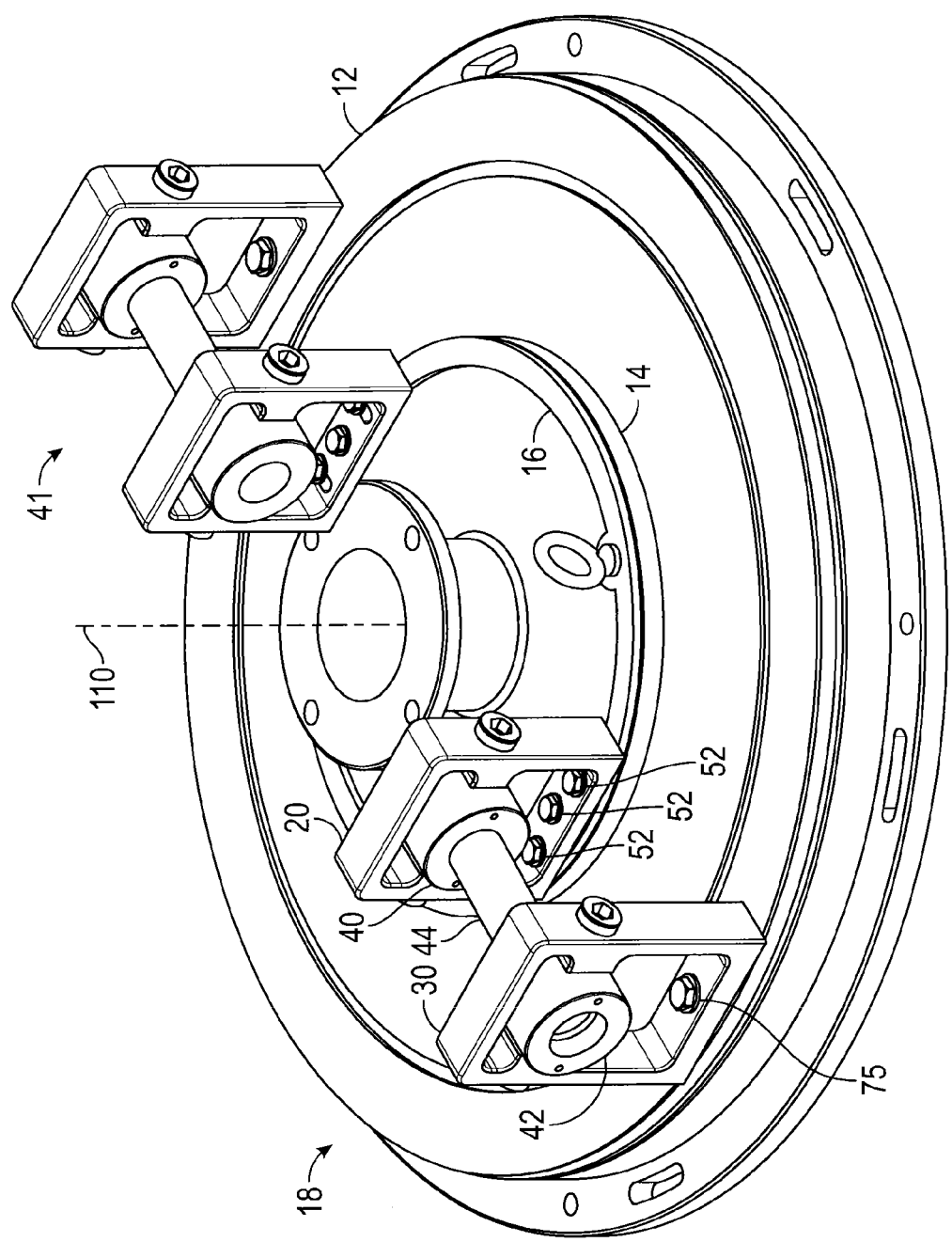
FIG. 11 is a perspective view of the rotary constant velocity stabilizer of FIG. 1 shown attached to a first rotatable body and a second rotatable body.

Referring now to the drawings, FIG. 1 illustrates one embodiment of a rotary joint constant velocity stabilizer 10 for connecting a first rotatable body 12 (FIG. 11) and a second rotatable body 14 (FIG. 11). The first and second rotatable bodies 12 and 14 are rotatable about a generally common axis of rotation 110 (FIG. 11) and rotatable at substantially similar angular velocities. In other embodiments, the rotary joint constant velocity stabilizer 10 may be used to make the first rotatable body 12 and the second rotatable body 14 rotatable about different axes of rotation and at substantially similar angular velocities.

The rotary joint constant velocity stabilizer 10 includes at least one stabilizer assembly 18 connectable to the first rotatable body 12 and the second rotatable body 14. In one embodiment, the rotary joint constant velocity stabilizer 10 may include a second stabilizer assembly 41 connectable to the second rotatable body 14 and the first rotatable body 12. The second stabilizer assembly 41 is similar to the stabilizer assembly 18, and as such will not be discussed in detail herein. In some embodiments, the rotary joint constant velocity stabilizer 10 is also provided with a mounting plate 16 which may be mounted between the stabilizer assembly 18 and the second rotatable body 14.

As shown in FIG. 1, the stabilizer assembly 18 has a first base 20, a second base 30, and a shaft 44 extending between the first base 20 and the second base 30. The first base 20 has a top 22, a bottom 24, a first side 26, and a second side 28, and the second base 30 a top 32, a bottom 34, a first side 36, and a second side 38. The shaft 44 has a first end 46 and a second end 48. The first end 46 of the shaft 44 is connected to the first base 20 such that the shaft 44 is pivotable relative to the first base 20 about a first axis 73 extending from the first side 26 to the second side 28. The second end 48 is connected to the second base 30 such that the shaft 44 is pivotable about a second axis 93 extending from the first side 36 to the second side 38 of the second base 30 and such that the shaft 44 is slidable relative to the second base 30 along a third axis 101 normal to the first axis 73 and the second axis 93, and rotatable relative to the second base 30 about the third axis 101 while preventing relative rotational motion between the first base 20 and the second base 30.

The shaft 44 is provided with a first end 46 and a second end 48. The shaft 44 extends between the first sleeve 40 and the second sleeve 42. The stabilizer assembly 18 is configured such that a distance between the first base 20 and the second base 30 is variable to compensate for variations in the given radial distance between the first and second rotatable bodies 12 and 14 during rotation of the first and second rotatable bodies 12 and 14.

In one embodiment, the shaft 44 may have a substantially uniform cross-section extending along its length. As shown, the shaft 44 may have a substantially circular cross-section. In other embodiments, the shaft 44 may have other cross-section shapes, such as oval or square. The length and cross-sectional area of the shaft 44 may be determined from the radial distance between the first and second rotatable bodies 12 and 14 and torque transmitted therebetween by the shaft 44. Generally, the larger the radial distance and the larger the torque transmitted, the larger the length and the larger the cross-sectional area of the shaft 44. In one embodiment, the shaft 44 may be made from stainless steel, chrome, or have chrome plating. In other embodiments, the shaft 44 may be made from other materials having suitable strength and weight characteristics.

Figure 2:
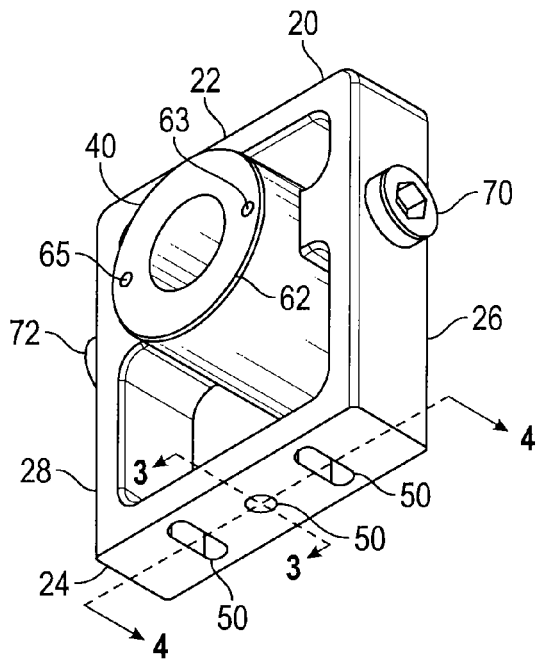
FIG. 2 is a perspective view of a first base assembly of the rotary joint constant velocity stabilizer.
Figure 3:
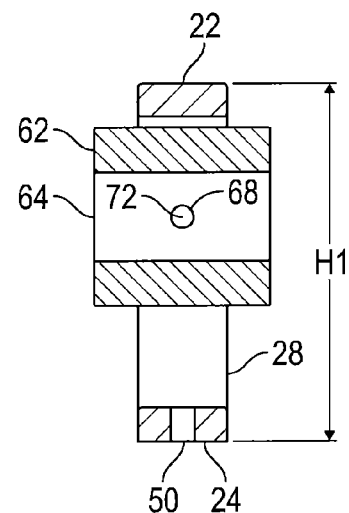
FIG. 3 is a sectional view of the first base assembly taken along line 3-3 of FIG. 2.
Figure 4:
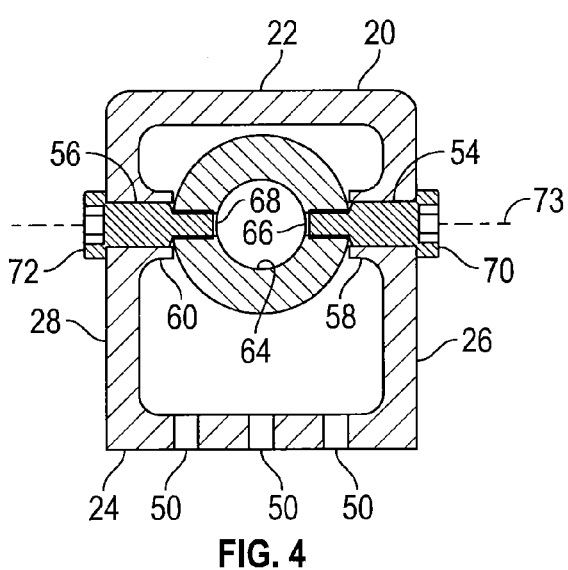
FIG. 4 is a sectional view of the first base assembly taken along line 4-4 of FIG. 2.
Figure 8:
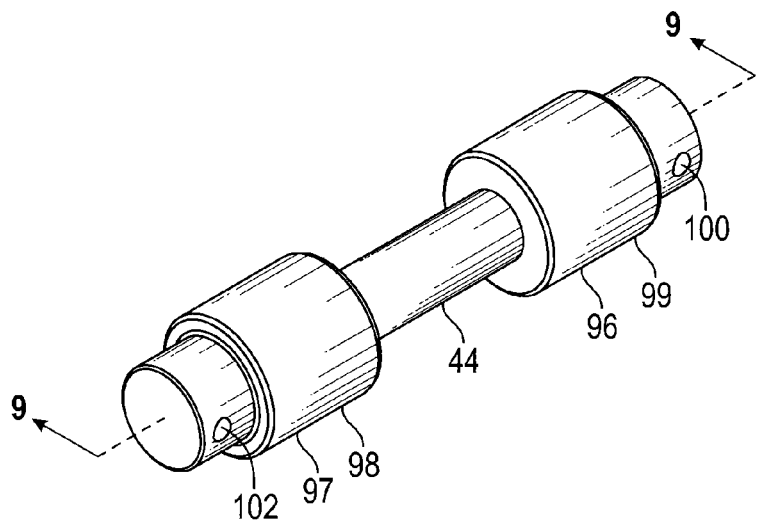
FIG. 8 is a perspective view of another embodiment of a first sleeve and a second sleeve shown in combination with the shaft.

Referring now to FIGS. 2-4, the first base 20 of the stabilizer assembly 18 is shown in combination with a first sleeve 40 for connecting the first end 46 of the shaft 44 to the first base 20. As previously discussed, the first base 20 may be provided with the top 22, bottom 24, first side 26, and second side 28. The first base 20 of the stabilizer assembly 18 further has a height H1 and the first axis 73. The first axis 73 extends between the first side 26 and the second side 28 of the first base 20. The first base 20 may be made of stainless steel, aluminum, or another suitable material having suitable strength and weight characteristics. The bottom 24 of the first base 20 is provided with a plurality of apertures 50 extending therethrough. As shown in FIG. 8, the first base 20 may be connected to the second rotatable body 14 and the mounting plate 16 by fasteners 52, such as screws, bolts, or other fasteners passed through the plurality of apertures 50 of the bottom 24 of the first base 20 and secured in the second rotatable body 14. The apertures 50 may be circular in shape, however, the apertures 50 may also be rectangular, slotted, oblong, or any other shape suitable for connection to the second rotatable body 14 and the mounting plate 16.

The first side 26 of the first base 20 and the second side 28 of the first base 20 are spaced to receive the first sleeve 40. The first side 26 of the first base 20 is provided with a first aperture 54 extending therethrough and the second side 28 of the first base 20 is provided with a second aperture 56 extending therethrough. In some embodiments, such as the one shown in FIGS. 2-4, the first axis 73 extends between the first side 26 and the second side 28 of the first base 20 centered in the first aperture 54 of the first side 26 and the second aperture 56 of the second side 28. The first side 26 of the first base 20 may further be provided with a first protrusion 58 extending from the first side 26 towards the second side 28 and the second side 28 of the first base 20 may be provided with a second protrusion 60 extending from the second side 28 towards the first side 26. In one embodiment, the first aperture 54 extends through the first protrusion 58 and the second aperture 56 extends through the second protrusion 60. In an embodiment, the first and second protrusions 58 and 60 are spaced from one another to receive the first sleeve 40.

The first sleeve 40 is configured to be received between the first side 26 and second side 28 of the first base 20. The first sleeve 40 has a proximal end 62, a bore 64, a first hole 66 extending though the first side 26, and a second hole 68 extending through the second side 28 opposite the first hole 66. The bore 64 of the first sleeve 40 is sized such that the first end 46 of the shaft 44 may be disposed therein. The bore 64 of the first sleeve 40 is further sized such that the first end 46 of shaft 44 may be fixed to the first sleeve 40. The first hole 66 of the first sleeve 40 is alignable with the first aperture 54 of the first side 26 of the first base 20 and the second hole 68 of the first sleeve 40 is alignable with the second aperture 56 of the second side 28 of the first base 20 in such a way that allows for a pair of fasteners 70 and 72, such as screws or bolts, to be disposed therein to pivotally fasten the first sleeve 40 to the first base 20. In the embodiment shown in FIGS. 2-4, the first sleeve 40 is pivotable relative to the first base 20 about the first axis 73.

The proximal end 62 of the first sleeve 40 may have a first aperture 63 extending towards the first hole 66 and a second aperture 65 extending towards the second hole 68. In one embodiment, fasteners (not shown) may be disposed in the first and second apertures 63 and 65 of the proximal end 62 of the first sleeve 40. The fasteners disposed in the first and second apertures 63 and 65 of the proximal end 62 of the first sleeve 40 may further coincide with the fasteners 70 disposed in the first side 26 of the first base 20 and the second side 28 of the first base 20 to provide a more secure fastening of the first sleeve 40 to the first base 20. In one embodiment (not shown), the first sleeve 40 may be provided with a third hole (not shown) and the first end 46 of the shaft 44 may be provided with a hole (not shown). The third hole and the hole of the shaft 44 may be aligned in such a way that allows for fixation of the first end 46 of the shaft 44 and the first sleeve 40 via a fastener (not shown). This fixation would prevent the shaft 44 from moving relative to the first sleeve 40. In the embodiments shown in the figures, the bore 64 of the first sleeve 40 and the shaft 44 are smooth. It should be noted, however, that in another embodiment of the stabilizer assembly 18, the bore 64 of the first sleeve 40 and the first end 46 of the shaft 44 may be threaded in such a way that the first end 46 of the shaft 44 may be threadably disposed in the bore 64 of the first sleeve 40.

Referring now to FIGS. 5-7, the second base 30 of the stabilizer assembly 18 is shown in combination with a second sleeve 42 and the shaft 44. As previously discussed, the second base 30 has a top 32, a bottom 34, a first side 36, and a second side 38. The second base 30 of the stabilizer assembly 18 further has a height H2 and the second axis 93. The height H2 may be equal to or greater than the height H1 of the first base 20. The second axis 93 extends between the first side 36 and the second side 38 of the second base 30. The third axis 101 is defined by the shaft 44 such that the third axis 101 extends longitudinally through the shaft 44 and is normal to the first axis 73 of the first base 20 and the second axis 93 of the second base 30. The second base 30 may be made of stainless steel, aluminum, or another suitable metal. The bottom 34 of the second base 30 is provided with at least one aperture 74 extending there through. The bottom 34 of the second base 30 is connectable to the first rotatable body 12 through the aperture 74 by a fastener 75 (FIG. 8), such as a screw, a bolt, or other fastener.

The first side 36 of the second base 30 and the second side 38 of the second base 30 are spaced to receive the second sleeve 42. The first side 36 of the second base 30 is provided with a first aperture 76 extending therethrough and the second side 38 of the second base 30 is provided with a second aperture 78 extending therethrough. In some embodiments, the second axis 93 extends between the first side 36 and the second side 38 of the second base 30 centered in the first aperture 76 of the first side 36 and the second aperture 78 of the second side 38. The first side 36 of the second base 30 may further be provided with a first protrusion 80 extending from the first side 36 towards the second side 38, while the second side 38 of the second base 30 may be provided with a second protrusion 82 extending from the second side 38 towards the first side 36. In one embodiment, the first aperture 76 extends through the first protrusion 80 and the second aperture 78 extends through the second protrusion 82. In one embodiment, the first and second protrusions 80 and 82 are spaced from one another to receive the second sleeve 42.

The second sleeve 42 is configured to be received between the first side 36 and second side 38 of the second base 30. The second sleeve 42 has a proximal end 84, a bore 86, a first hole 88 extending though the first side 36, and a second hole 90 extending through the second side 38 opposite the first hole 88. The bore 86 of the second sleeve 42 is sized such that the second end 48 of the shaft 44 may be disposed therein. The bore 86 of the second sleeve 42 is further sized such that the second end 48 of the shaft 44 may be slidably and rotatably attached to the second sleeve 42. The shaft 44 is slidable relative to the second base 30 along the third axis 101 normal to the first axis 73 of the first base 20 and the second axis 93 of the second base 30. The shaft 44 is rotatable about the third axis 101 while preventing relative motion between the first base 20 and the second base 30. The first hole 88 of the second sleeve 42 is alignable with the first aperture 76 of the first side 36 of the second base 30 and the second hole 90 of the second sleeve 42 is alignable with the second aperture 78 of the second side 38 of the second base 30 in such a way that allows for a pair of fasteners 92 and 94, such as screws or bolts, to be disposed therein to pivotally attach the second sleeve 42 to the second base 30. In the embodiment shown in FIGS. 5-7, the second sleeve 42 is pivotable relative to the second base 30 about the second axis 93.

The proximal end 84 of the second sleeve 42 may have a first aperture 89 extending towards the first hole 88 and a second aperture 91 extending towards the second hole 90. In an embodiment, fasteners (not shown) may be disposed in the first and second apertures 89 and 91 of the proximal end 84 of the second sleeve 42. The fasteners disposed in the first and second apertures 89 and 91 of the proximal end 84 of the second sleeve 42 may further coincide with the fasteners 92 and 94 disposed in the first side 36 of the second base 30 and the second side 38 of the second base 30, respectively, to provide a more secure fastening of the second sleeve 42 to the second base 30.

In one embodiment, the bore 86 of the second sleeve 42 may be a first bore and the second sleeve 42 may be provided with a second bore 87 configured to receive a bearing 95, such as for instance, a ceramic bearing. The bearing 95 is sized such that the second end 48 of the shaft 44 may be disposed therein. Further, the bearing 95 is contoured such that the bearing 95 allows for the second end 48 of the shaft 44 to be slidable and rotatable relative to the second sleeve 42. In one embodiment, the second bore 87 may be threaded to engage the bearing 95, however, in one embodiment the second bore 87 is smooth.

Figure 9:
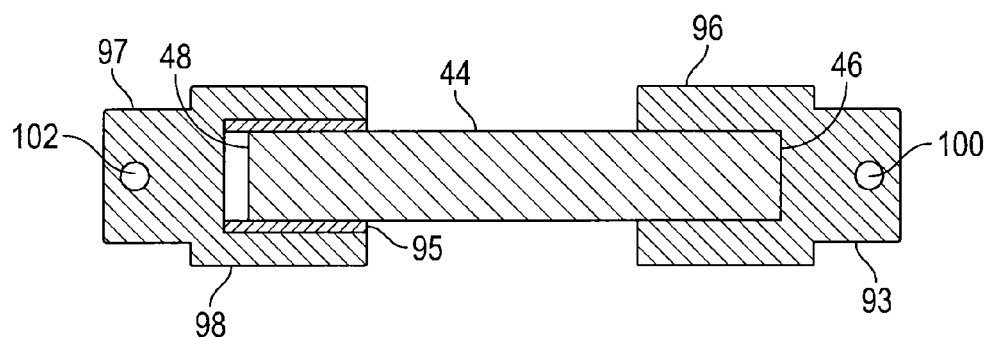
FIG. 9 is a sectional view taken along line 9-9 of FIG. 8.

Referring now to FIGS. 8-9, another embodiment of a first sleeve 99 and a second sleeve 97, as illustrated in combination with the shaft 44. As shown in FIGS. 8 and 9, the first sleeve 99 is in the form of a first shaft cap 96, and the second sleeve 97 is in the form of a second shaft cap 98. The first end 46 of the shaft 44 may be fixed in the first shaft cap 96. The second end 48 of the shaft 44 may be slidably and rotatably disposed in the second shaft cap 98. With the shaft 44 disposed in the first shaft cap 96 and the second shaft cap 98, the first shaft cap 96 may be connected to the first sleeve 40 and the second shaft cap 98 may be connected to the second sleeve 42. The connection between the first shaft cap 96 and the first sleeve 40 may occur through the use of a fastener (not shown) through a hole 100 on the first shaft cap 96. Similarly, the connection between the second shaft cap 98 and the second sleeve 42 may occur through the use of a fastener (not shown) through a hole 102 on the second shaft cap 98. In this embodiment, the shaft 44 would slide within the second shaft cap 98, as opposed to the previously described embodiment wherein the shaft 44 would slide within the second sleeve 42 or the bearing 95 within the second sleeve 42.

Figure 10:
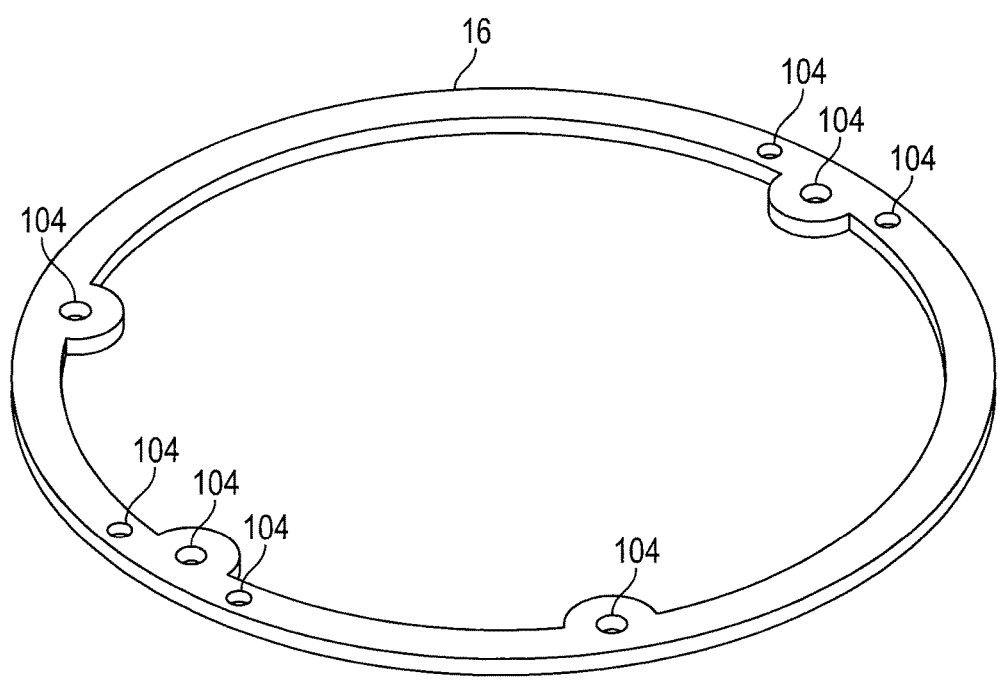
FIG. 10 is a perspective view of a mounting plate of the rotary joint constant velocity stabilizer.

Referring now to FIG. 10, the mounting plate 16 is illustrated. The mounting plate 16 is generally flat so as to lay flush with the second rotatable body 14. Further, the mounting plate 16 is provided with a plurality of holes 104. The holes 104 are alignable with the bottom side 23 of the first base 20 of the stabilizer assembly 18. The plurality of holes 104 are also alignable with holes (not shown) of the second rotatable body 14 to allow for connection therebetween. The mounting plate 16 may be made of stainless steel, aluminum, or another suitable metal.

Referring now to FIGS. 11-12, the installation and the operation of rotary joint constant velocity stabilizer 10 on a radar antenna system (not shown) will be described. As is known in the art, a rotatable radar antenna system includes a rotatable platform such as the second rotatable body 14 on which a radar antenna (not shown) is mounted. A slip ring (not shown) is disposed coaxially with the second rotatable body 14 such that both the slip ring and the second rotatable body 14 have a generally common axis of rotation 110. The slip ring is attached to the second rotatable body 14 and a fixed portion (not shown) which may be secured to a base (not shown) of a radar, for instance. In some radar antenna systems (not shown), the slip ring may contain coolant ports to deliver coolant to the antenna connected to the second rotatable body 14. In the illustrated embodiment, the second rotatable body 14 is coupled to the first rotatable body 12 via the rotary joint constant velocity stabilizer 10. According to one embodiment of the presently disclosed inventive concepts, the rotary joint constant velocity stabilizer 10 serves to maintain a consistent angular bearing of the radar antenna system relative to the first rotatable body 12. The rotary joint constant velocity stabilizer 10 is configured to compensate for variations in radial distance between the first rotatable body 12 and the second rotatable body 14. Such variations in the radial distance may be caused by component run-out of the second rotatable body 14 and/or the first rotatable body 12 as well as by divergence of the axes of rotation of the second rotatable body 14 and/or the first rotatable body 12 from their common axis of rotation 110. Coolant delivery systems (not shown) installed on the radar antenna system may introduce high drag torques opposing the torque transmitted from the second rotatable body 14 to the first rotatable body 12.

In one embodiment, stabilizer assembly 18 of the rotary joint constant velocity stabilizer 10 is rigidly or fixedly mounted on the rotatable component of the radar antenna system such as the second rotatable body 14 via fasteners 52. As shown in FIG. 11, the fasteners 52 may also pass through the mounting plate 16 situated between the bottom 24 of the first base 20 and the second rotatable body 14. Other configurations may include other fastening mechanisms (for example, welding) for fixedly coupling the first base 20 to the second rotatable body 14.

Drag torques may be exerted on the first rotatable body 12, for example, caused by the coolant delivery system. Such drag torques may cause the first rotatable body 12 to lag relative to the second rotatable body 14 and cause undesirable bending and/or deflection of shaft 44. The shaft 44 may also be subjected to undesirable bending and/or deflection due to run-outs and variations in the axes of rotation of the first rotatable body 12, as described herein. The rotary joint constant velocity stabilizer 10 provides a degree of freedom to compensate for component runout and axis of rotation variations and to prevent or reduce undesirable bending and/or deflection of the shaft 44. The degree of flexibility is provided by the ability of the shaft 44 to slide axially along the third axis 101 in and out of the second sleeve 42, for instance, which also reduces the bending and/or deflection of the shaft 44. This degree of flexibility compensates for the variations in the radial distance between the first rotatable body 12 and the second rotatable body 14 due to component run-outs and/or variation in their axes of rotation from the common axis of rotation 110.

When the radar antenna system is in an operational mode, the radial distance between the second rotatable body 14 and the first rotatable body 12 may vary during operation. This may be due, at least in part, to component run-out and/or variations in axes of rotation of the second rotatable body 14 and the first rotatable body 12. Such variations in the radial distance are automatically accommodated by the rotary joint constant velocity stabilizer 10 by allowing the shaft 44 to slide axially relative to the first base 20 and the second base 30 along the third axis 101 normal to the first axis 73 and the second axis 93 thereby adjusting the length of the shaft 44 between the first base 20 and the second base 30 while the radar antenna system is in operational mode. As described herein, if the radial distance between the second rotatable body 14 and the first rotatable body 12 decreases due to component run-outs and/or variations in the axes of rotation, the length of the shaft 44 between the first base 20 and the second base 30 is shortened, thereby preventing or reducing a bending of components of the stabilizer assembly 18 about the common axis of rotation 110. Similarly, if the radial distance increases between the second rotatable body 14 and the first rotatable body 12 due to component run-outs and/or variations in the axes of rotation, the length of shaft 44 between the first base 20 and the second base 30 is increased, thereby preventing or reducing stresses on components of the rotary joint constant velocity stabilizer 10 as well as the first rotatable body 12 and the second rotatable body 14. The rotary joint constant velocity stabilizer 10, thus, serves to reduce the bending and/or deflection associated with prior art systems thereby maintaining a consistent angular bearing of the second rotatable body 14 relative to the first rotatable body 12.

From the above description, it is clear that the inventive concepts disclosed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and defined in the appended claims.

What is claimed is:

1. A rotary joint constant velocity stabilizer for connecting a first rotatable body and a second rotatable body, the first and second rotatable bodies being rotatable about a generally common axis of rotation and rotatable at substantially similar angular velocities, the rotary constant velocity stabilizer, comprising:
   a first base having a top, a bottom, a first side, and a second side, the bottom being connectable to the first rotatable body;
   a second base having a top, a bottom, a first side, and a second side, the bottom of the second base being connectable to the second rotatable body; and
   a shaft having a first end and a second end, the first end being connected to the first base such that the shaft is pivotable relative to the first base about a first axis extending from the first side to the second side of the first base, the second end being connected to the second base such that the shaft is pivotable about a second axis extending from the first side to the second side of the second base, the shaft being slidable relative to the second base along a third axis normal to the first axis and the second axis, and rotatable relative to the second base about the third axis while preventing relative rotational motion between the first base and the second base.

2. The rotary joint constant velocity stabilizer of claim 1, further comprising:
   a first sleeve pivotally attached to the first base; and
   a second sleeve pivotally attached to the second base,
   wherein the first end of the shaft is fixed within the first sleeve and the second end of the shaft is disposed in the second sleeve so as to be slidable and rotatable relative to the second sleeve.

3. The rotary joint constant velocity stabilizer of claim 1, wherein the first base has a first height and the second base has a second height, the second height of the second base being the same as the height of the first base.

4. The rotary joint constant velocity stabilizer of claim 1, wherein the first base has a first height and the second base has a second height, the second height of the second base being greater than the height of the first base.

5. A rotary joint constant velocity stabilizer for connecting a first rotatable body and a second rotatable body, the first and second rotatable bodies being rotatable about a generally common axis of rotation and rotatable at substantially similar angular velocities, the rotary constant velocity stabilizer, comprising:
   a mounting ring being connectable to the first rotatable body;
   a first base having a top, a bottom, a first side, and a second side, the bottom being connected to the mounting ring;
   a second base having a top, a bottom, a first side, and a second side, the bottom of the second base being connectable to the second rotatable body; and
   a shaft having a first end and a second end, the first end being connected to first base such that the shaft is pivotable relative to the first base about a first axis extending from the first side to the second side of the first base, the second end being connected to the second base such that the shaft is pivotable about a second axis extending from the first side to the second side of the second base, the shaft being slidable relative to the second base along a third axis normal to the first axis and the second axis, and rotatable relative to the second base about the third axis while preventing relative rotational motion between the first base and the second base.

6. The rotary joint constant velocity stabilizer of claim 5, further comprising:
   a first sleeve pivotally attached to the first base; and
   a second sleeve pivotally attached to the second base,
   wherein the first end of the shaft is fixed within the first sleeve and the second end of the shaft is disposed in the second sleeve so as to be slidable and rotatable relative to the second sleeve.

7. The rotary joint constant velocity stabilizer of claim 5, wherein the first base has a first height and the second base has a second height, the second height of the second base being the same as the height of the first base.

8. The rotary joint constant velocity stabilizer of claim 5, wherein the first base has a first height and the second base has a second height, the second height of the second base being greater than the height of the first base.

9. A rotary joint, comprising:
   a first rotatable body;
   a second rotatable body, the first and second rotatable bodies being rotatable about a generally common axis of rotation and rotatable at substantially similar angular velocities; and
   a stabilizer assembly comprising:
      a first base having a top, a bottom, a first side, and a second side, the bottom being connected to the first rotatable body;
      a second base having a top, a bottom, a first side, and a second side, the bottom of the second base being connected to the second rotatable body; and
      a shaft having a first end and a second end, the first end being connected to first base such that the shaft is pivotable relative to the first base about a first axis extending from the first side to the second side of the first base, the second end being connected to the second base such that the shaft is pivotable about a second axis extending from the first side to the second side of the second base, the shaft being slidable relative to the second base along a third axis normal to the first axis and the second axis, and rotatable relative to the second base about the third axis while preventing relative rotational motion between the first base and the second base.

10. The rotary joint of claim 9, wherein the stabilizer assembly further comprises a mounting ring secured between the bottom of the first base and the first rotatable body.

11. The rotary joint of claim 9, wherein the stabilizer assembly is a first stabilizer assembly and the rotary joint further comprises a second stabilizer assembly connected to the first rotatable body and the second rotatable body opposite the first stabilizer assembly, the second stabilizer assembly comprising:

a first base having a top, a bottom, a first side, and a second side, the bottom being connected to the first rotatable body;

a second base having a top, a bottom, a first side, and a second side, the bottom of the second base being connected to the second rotatable body; and a shaft having a first end and a second end, the first end being connected to first base such that the shaft is pivotable relative to the first base about a first axis extending from the first side to the second side of the first base, the second end being connected to the second base such that the shaft is pivotable about a second axis extending from the first side to the second side of the second base, the shaft being slidable relative to the second base along a third axis normal to the first axis and the second axis, and rotatable relative to the second base about the third axis while preventing relative rotational motion between the first base and the second base.

12. The rotary joint of claim 11, wherein the stabilizer assembly further comprises a mounting ring secured between the bottom of the first base of the first stabilizer assembly, the bottom of the first base of the second stabilizer assembly, and the first rotatable body.

\* \* \* \* \*